United States Patent
Stiner et al.

(10) Patent No.: US 6,626,386 B1
(45) Date of Patent: Sep. 30, 2003

(54) NON-WEAR DRAG WASHER FOR FISHING REELS

(75) Inventors: Roy E. Stiner, Owasso, OK (US); Christopher S. Littau, Bartlesville, OK (US)

(73) Assignee: W. C. Bradley/Zebco Holdings, Inc., Tulsa, OK (US)

( * ) Notice: Subject to any disclaimer, the term of this patent is extended or adjusted under 35 U.S.C. 154(b) by 0 days.

(21) Appl. No.: 09/900,517

(22) Filed: Jul. 7, 2001

(51) Int. Cl.[7] .............................................. A01K 89/02
(52) U.S. Cl. ...................... 242/285; 242/244; 242/264
(58) Field of Search ................... 242/244, 245, 242/264, 268, 285

(56) References Cited

U.S. PATENT DOCUMENTS

| | | | |
|---|---|---|---|
| 3,683,846 A | * 8/1972 | Flournoy et al. ............... 118/33 |
| 4,196,868 A | 4/1980 | Puryear et al. ........ 242/84.2 G |
| 4,371,124 A | 2/1983 | Gifford et al. ........ 242/84.51 A |
| 4,378,914 A | 4/1983 | Shackelford et al. . 242/84.21 A |
| 4,545,545 A | 10/1985 | Councilman ........... 242/84.5 R |
| 4,549,702 A | 10/1985 | Councilman ......... 242/84.51 A |
| 4,664,330 A | 5/1987 | Darden ....................... 242/84.5 |
| 4,774,603 A | * 9/1988 | Dong et al. ..................... 360/71 |
| 5,159,776 A | * 11/1992 | Horton et al. .................... 43/24 |
| 5,207,396 A | 5/1993 | Furomoto .................... 242/321 |
| 5,218,501 A | * 6/1993 | Sellke .................... 360/130.21 |
| 5,244,165 A | 9/1993 | Valentine et al. ............ 242/244 |
| 5,299,758 A | * 4/1994 | Sato ............................ 192/69 |
| 5,411,583 A | * 5/1995 | Bennison et al. ......... 106/14.05 |
| 5,427,325 A | 6/1995 | Weaver ....................... 242/244 |
| 5,921,491 A | 7/1999 | Kim ............................ 242/268 |
| 5,935,143 A | * 8/1999 | Hood .......................... 606/169 |
| 6,045,075 A | * 4/2000 | Iwabuchi et al. ............ 242/279 |
| 6,152,389 A | 11/2000 | Kim ............................ 242/260 |
| 6,206,311 B1 | 3/2001 | Kim et al. ................... 242/288 |
| 6,230,432 B1 | * 5/2001 | Blank ............................. 43/24 |
| 6,286,244 B1 | * 9/2001 | Weiss ....................... 43/18.1 R |
| 2001/0020661 A1 | * 9/2001 | Ohara ......................... 242/264 |

FOREIGN PATENT DOCUMENTS

JP        2002027768 A * 1/2002 ............ H02N/2/00

* cited by examiner

*Primary Examiner*—Emmanuel Marcelo
(74) *Attorney, Agent, or Firm*—Fellers, Snider, Blankenship, Bailey & Tippens, P.C.

(57) ABSTRACT

A drag washer of ceramic material is provided in a drag assembly for a fishing reel. The ceramic drag washer surprisingly provides the unique combination of hardness and surface finish to render desirable performance characteristics for a high quality drag assembly.

11 Claims, 3 Drawing Sheets

NON-WEAR DRAG WASHER FOR FISHING REELS

BACKGROUND OF THE INVENTION

1. Field of the Invention

This invention relates generally to fishing reels, and, more particularly, to fishing reels having a drag washer as part of the drag system operating directly or indirectly on the spool.

2. Background

Fishing reels typically have drag assemblies for applying varying degrees of drag on drag washers bearing directly or indirectly on the spool for varying the tension on the line required to rotate the spool relative to the reel housing. This adjustable tension allows the line to be pulled from the spool at a value below the breaking strength of the line, thus preventing a hard fighting fish from breaking the line and being lost.

When an excessive pulling force is applied to the fishing line, the drag system counteracts the reel's anti-reverse mechanism to payout a sufficient amount of additional fishing line to prevent the line from breaking. Most drag systems function to allow either (a) an adjustable degree of rotational slippage of the line spool about the spool hub or (b) an adjustable degree of rotational slippage of the drive gear about the crankshaft. A typical drag system will also include an external adjustment means comprising either a finger-operated drag wheel projecting from the reel housing, a star-shaped dial operably secured adjacent the crank handle on the exterior end of the crankshaft, or other dial means operably secured to the reel housing or spool.

An essential element of drag assemblies is the so-called friction washers which are compressed between an axially movable, non-rotatable member and a rotatable member which may be the line spool or which may be a member fixed on a shaft upon which the line spool is mounted or which may be a gear, such as a drive gear, operative through a gear train to effect rotation of the spool. The compression on the friction washers is increased or decreased to increase or decrease the resistance to rotation of the spool. It is desirable to provide drag washer materials that have a static coefficient of friction close to the dynamic coefficient to prevent stick/slip conditions that cause large excursions in line tension as the line is pulled from the reel. Many materials are able to provide the conditions that minimize stick/slip and give a "smooth" drag, but they are commonly very soft and abrade easily. This occurs especially when fighting large fish that swim at high speeds.

SUMMARY OF THE INVENTION

The present invention solves the problems described above and still provides a smooth drag through the utilization of ceramic drag washers. It has been discovered that drag washers of ceramic material surprisingly provide the unique combination of hardness and surface finish to render desirable performance characteristics for a high quality drag assembly. Additional benefits are obtained by the use of ceramic drag washers, including corrosion resistance, high strength, lubrication resistance and stiffness.

Thus, the present invention provides a fishing reel having a reel body, a line carrying spool rotatably mounted in relation to the reel body, a drag assembly for applying a drag to the spool to resist rotation of the spool, the drag assembly including at least one ceramic drag washer, and adjusting means for increasing and decreasing the pressure on the ceramic drag washer which increases and decreases the drag applied to the spool.

A better understanding of the present invention, its several aspects, and its advantages will become apparent to those skilled in the art from the following detailed description, taken in conjunction with the attached drawings, wherein there is shown and described the preferred embodiment of the invention, simply by way of illustration of the best mode contemplated for carrying out the invention.

DETAILED DESCRIPTION OF THE PREFERRED EMBODIMENTS

Figure 1:
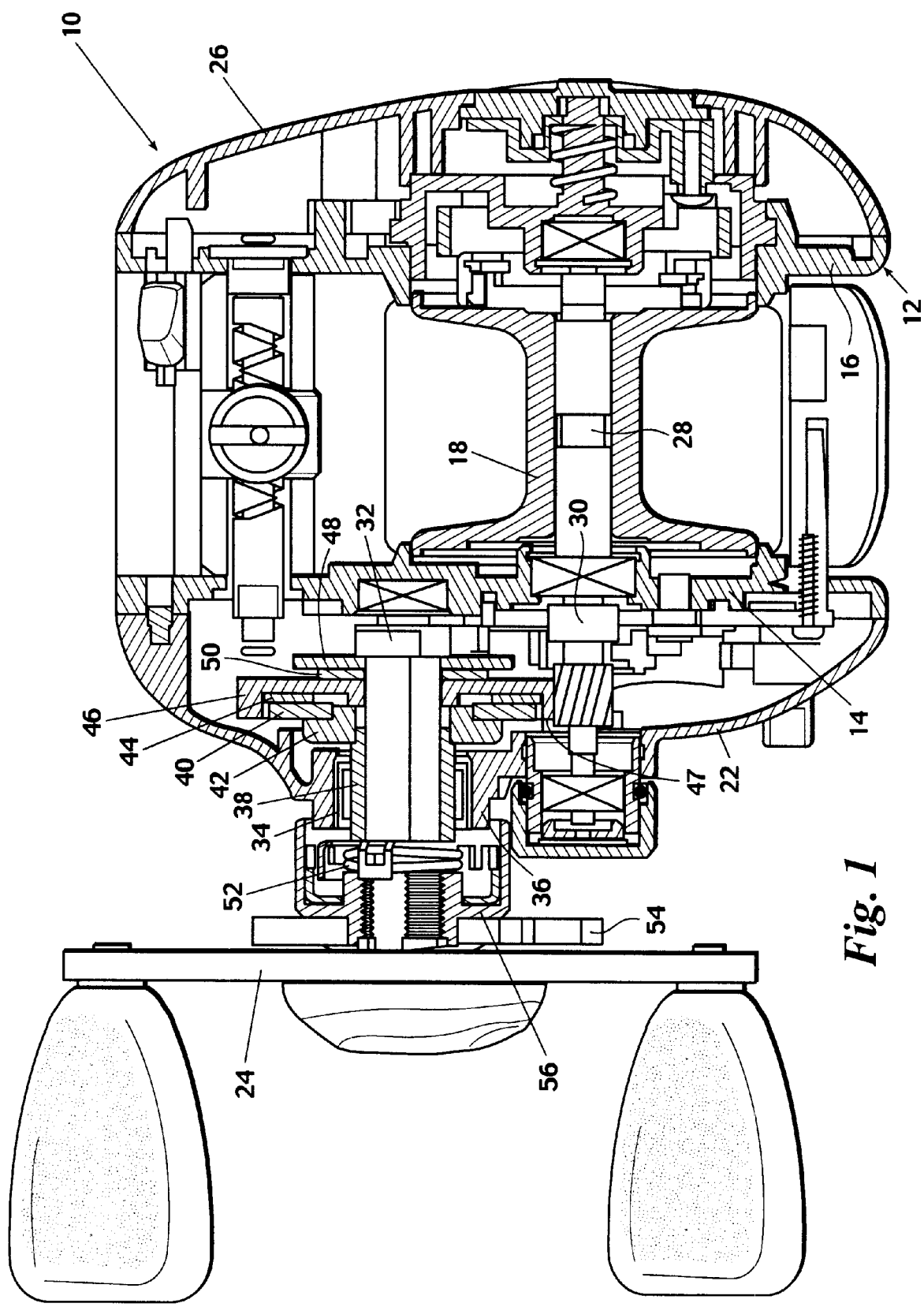
FIG. 1 is a sectional bottom view of a typical baitcast fishing reel which houses a crankshaft assembly which includes, inter alia, a drag assembly.

Before explaining the present invention in detail, it is important to understand that the invention is not limited in its application to the details of the construction and the steps described herein. The invention is capable of other embodiments and of being practiced or carried out in a variety of ways. It is to be understood that the phraseology and terminology employed herein is for purpose of description and not of limitation.

In one preferred embodiment, the present invention is shown and described herein in the environment of a baitcast type fishing reel. Baitcast fishing reels are well known in the art and typically comprise a split frame having a pair of opposing side plates; a foot extending from the frame for attaching the reel to a fishing rod; a line spool, rotatably positioned between the frame side plates, for retrieving and holding a fishing line; a spool shaft, on which the spool is secured, having ends extending through the frame side plates; a pinion gear (typically a helical gear) provided on the spool shaft; a manually rotatable crank handle; a gear train and crankshaft assembly mechanically linking the crank handle to the spool shaft pinion gear; a level-wind mechanism which transverses the spool during winding to ensure that the fishing line is properly wound along the length of the spool; and an exterior actuator (typically a thumb lever) for disengaging the pinion gear from the spool shaft to allow the spool to rotate freely during casting. It is conventional that such reels further include a clutch mechanism for preventing reverse rotation of the crank handle and a drag assembly for applying a variable drag force directly or indirectly to the line-carrying spool so that any pull on the line in the direction of line pay-out, such as normally occurs when a fish bites, in excess of that to which the drag is set, will cause the spool to turn.

One conventional drag apparatus, such as found in baitcast reels, includes a drag washer normally keyed on an end portion of the crankshaft such that the drag washer rotates with the crankshaft. The drag washer will generally have a friction pad or disk facing axially and in friction-engaging contact with one face of a driving gear. The driving gear is freely rotatably and axially movable on the crankshaft, and meshes with the input pinion gear on the spool shaft. A ratchet wheel is normally secured to the crankshaft so as to rotate with, but is prohibited from axial movement on, the crankshaft. Generally, a second friction pad or disk is mounted on an axial face of the ratchet wheel for friction-engaging contact with the other face of the driving gear.

In baitcast reels having a one-way clutch, the drag washer is generally forced against the driving gear by the clutch sleeve. Using a drag adjustment knob on the crankshaft, the clutch sleeve is normally forced against the drag washer, via a drag link, so as to create a sufficient frictional force on either side of the driving gear to rotate the driving gear to retrieve line onto the spool, and also to set the drag to an appropriate setting.

As will be readily understood by those skilled in the art, a baitcast fishing reel includes numerous other components and features not relevant to the present invention. Those mechanisms requiring description so that the present invention may be fully appreciated are explained in detail below. Further reference may be had to issued United States patents in the name of Brunswick Corporation, for example, to U.S. Pat. Nos. 6,206,311 or 6,152,389 or 5,921,491, such patents being incorporated herein by reference, for additional description of other conventional elements of a baitcast fishing reel.

Moreover, although the inventive apparatus is herein described as incorporated in a baitcast type fishing reel, the inventive drag washer is equally adaptable for use in other types of fishing reels, such as so-called spincast reels and spinning reels. A typical spincast style reel is shown and described in U.S. Pat. No. 4,378,914 to Shackelford et al., and later in U.S. Pat. Nos. 4,664,330; 5,244,165; and 5,427,325, wherein the drag on the spool and line is varied by rotating a wheel or knob which increases and decreases pressure on drag washers bearing on the spool. A typical spinning style reel is shown and described in U.S. Pat. No. 4,371,124 to Gifford et al., and later in U.S. Pat. Nos. 4,545,545 and 4,549,702, wherein drag washers bear on parts in the drag assembly for varying the tension on the line required to rotate the spool relative to the reel housing. All of the above-identified patents are incorporated herein by reference.

In another preferred embodiment, and to further illustrate the wide applicability of the invention across reel types, the invention is shown and described in the environment of a spinning type fishing reel.

Figure 2:
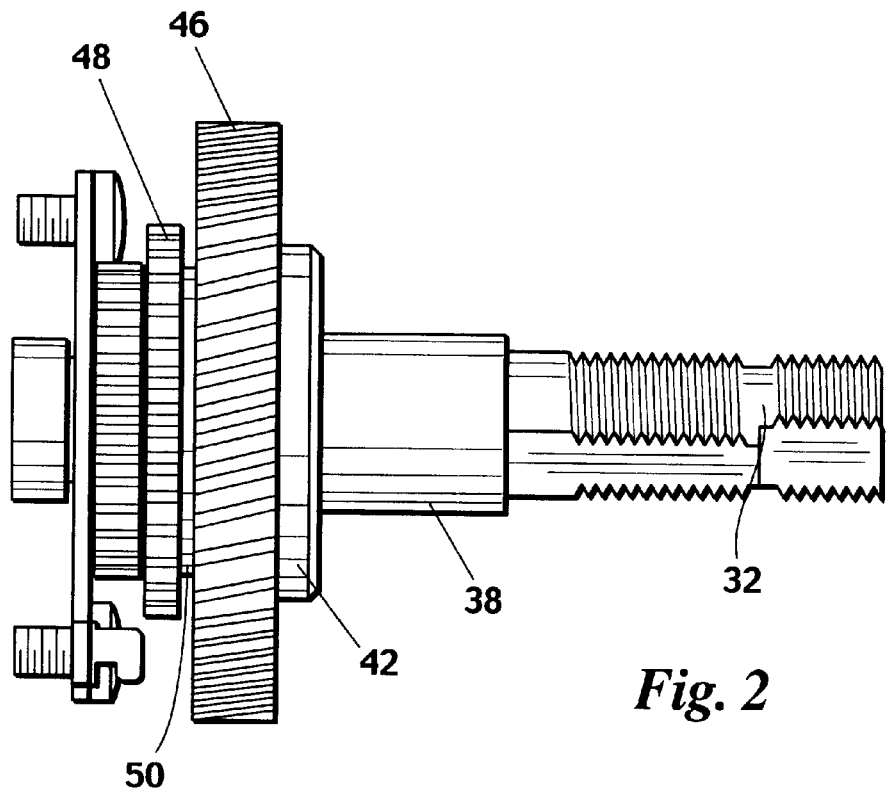
FIG. 2 is a side view of the crankshaft assembly in an assembled state.
Figure 3:
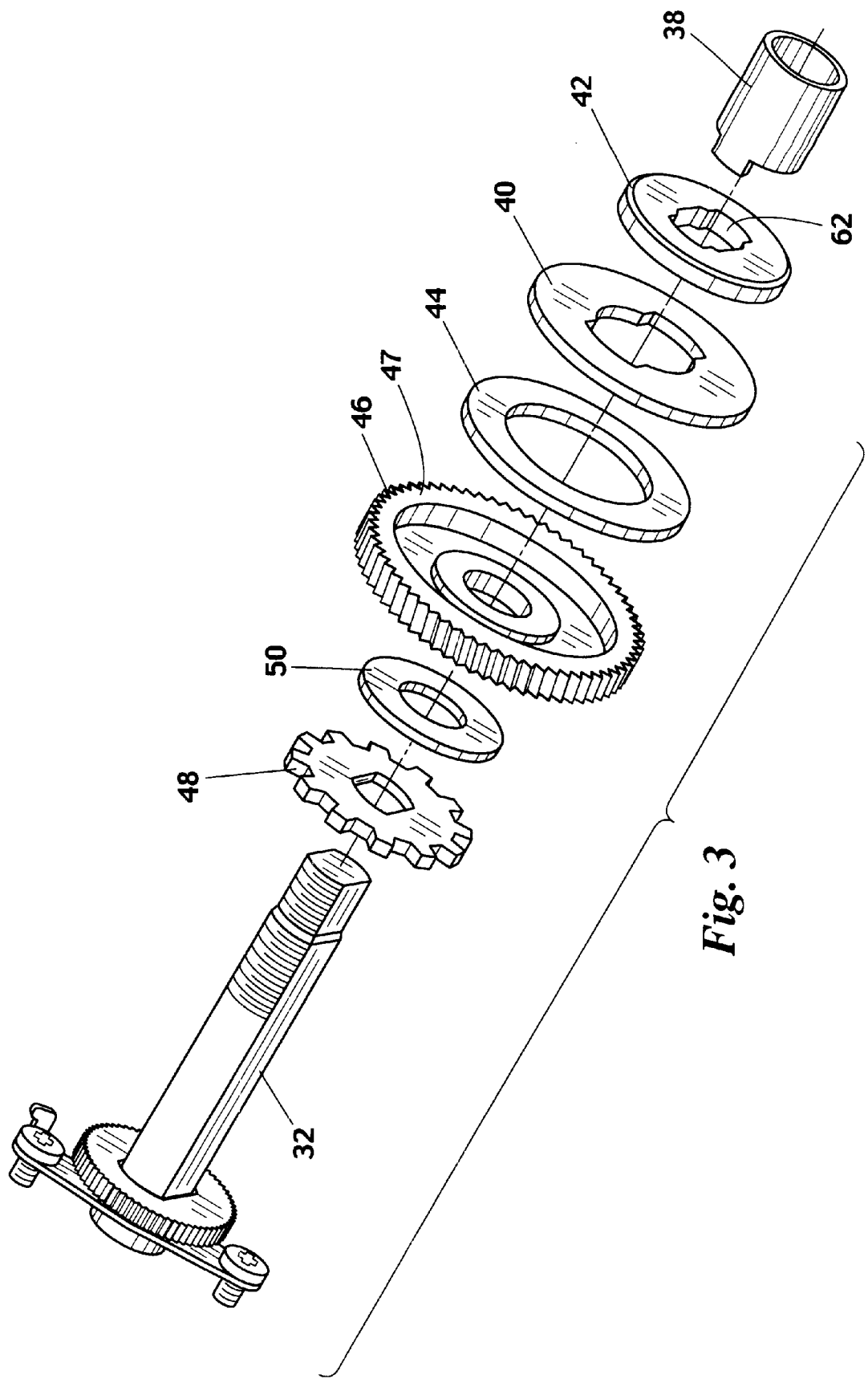
FIG. 3 is an exploded view of the crankshaft assembly shown in FIG. 2.

Turning now to the drawings, wherein like reference numerals designate identical or corresponding parts throughout the several views, and referring particularly to FIGS. 1–3, which illustrate the present invention in the environment of a baitcast type fishing reel, there is shown a baitcast fishing reel 10 including a frame 12 having a right side plate 14 and a left side plate 16; a line spool 18 rotatably mounted in frame 12 between side plates 14 and 16; a right side cover 22 secured over right side plate 14; a crank handle 24, operably extending from right side cover 22, for rotating spool 18; and a left side cover 26 secured over left side plate 16. A reel foot (not shown) is provided on the bottom of frame 12 for attaching reel 10 to a fishing rod. A spool shaft 28 is mounted between the laterally spaced side plates 14 and 16. A driven pinion gear 30 is keyed to rotate with the spool shaft 28 and is axially slidable on the spool shaft 28. The pinion gear 30 is operatively manipulated by a clutch system (not shown) that is well-known in the art.

Included in the right side of reel 10 is a crankshaft assembly comprising a crankshaft 32; a one-way clutch 34 retained in an open boss 36 projecting from right side cover 22; and a clutch sleeve 38 received in clutch 34. Crank handle 24 is secured on the exterior end of crankshaft 32. Clutch sleeve 38 is keyed or otherwise secured on crankshaft 32 such that sleeve 38 and crankshaft 32 are prevented from rotating independently of each other.

A drag mechanism is likewise mounted on the crankshaft 32, and in the embodiment shown in FIGS. 1–3 includes a drag washer 40, a link 42 and the clutch sleeve 38. The link 42 is keyed on the crankshaft 32 and is only axially movable thereon. The drag washer 40 and the clutch sleeve 38 are axially movable on the crankshaft, the clutch sleeve 38 being keyed to the link 42. The drag washer 40 may abut a friction pad 44 facing axially and in friction-engaging contact with one face of a driving gear 46. The driving gear 46 includes an annular shoulder 47 defining an inner diameter. The friction pad 44 is mounted at or near the outer perimeter of the drag washer 40, with the diameter of the drag washer 40 substantially equal to the inner diameter of the driving gear 46. Accordingly, applying the lateral force to the driving gear 46 over substantially the outermost diameter of the drag washer 40, permits the application of a relatively large force to the driving gear 46 with a relatively minimal tightening torque.

The driving gear 46 is freely rotatably and axially movable on the crankshaft 32. The driving gear 46 meshes with the pinion gear 30 on the spool shaft 28. A ratchet wheel 48 is secured to the crankshaft 32 so as to rotate with the crankshaft, but is prohibited from axial movement relative to the crankshaft 32. A second friction pad 50 is mounted on an axial face of the ratchet wheel 48 for friction-engaging contact with the other face of the driving gear 46.

Belleville springs 52 encircle the crankshaft 32 at the outer end thereof with a drag-actuating knob, or star drag 54, threaded on the crankshaft 32. The drag-actuating knob 54 has a sleeve portion 56 bearing against one side of the belleville springs 52. The other side of the belleville springs 52 bears against the clutch sleeve 38.

Turning the drag-actuating knob 54 in one direction relative to the crankshaft 32 urges the belleville springs 52, clutch sleeve 38, link 42 and drag washer 40 against the driving gear 46 and ratchet wheel 48 to increase the captive force on the driving gear 46 between the link 42 and ratchet wheel 48, which are keyed to rotate with the crankshaft 32, to thereby cause the driving gear 46 to be slippingly held to the crankshaft 32 for rotation with the crankshaft 32. Turning the drag-actuating knob 54 in the opposite direction reduces the captive force on the driving gear 46.

Figure 4:
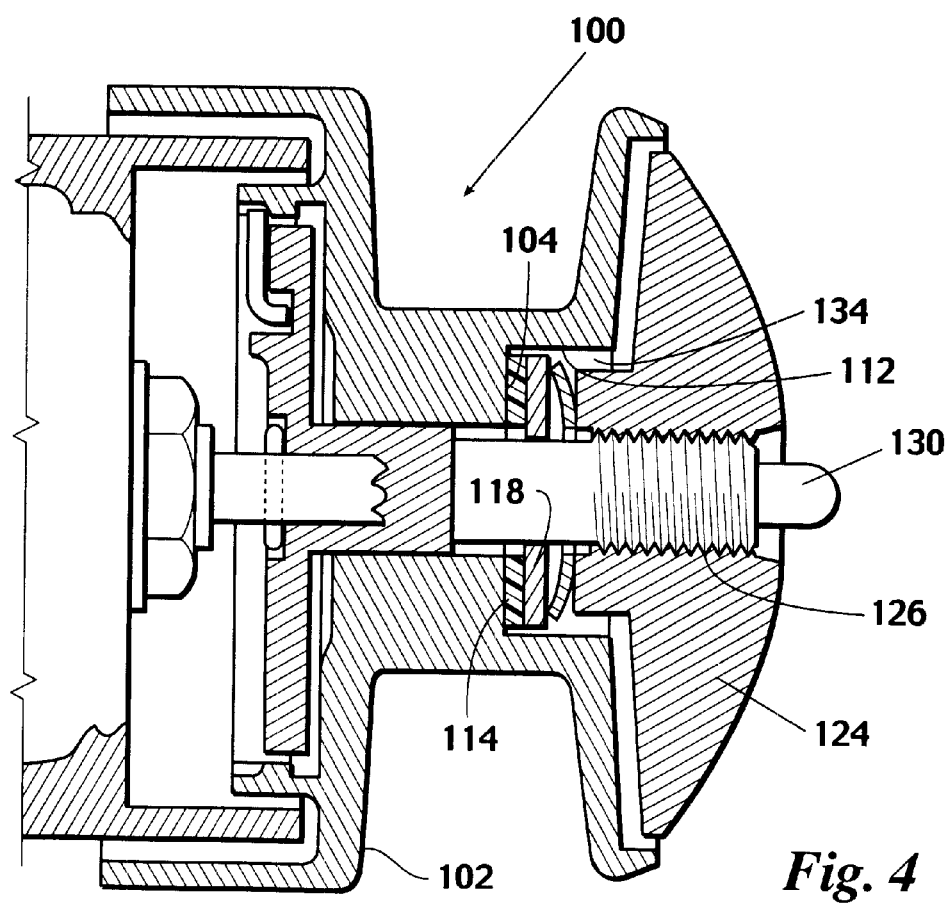
FIG. 4 is a cross sectional view of a spool and drag assembly as mounted on a spinning reel.

In another preferred embodiment, as shown in FIG. 4, the inventive ceramic drag washer is incorporated in a spinning reel 100. Spinning reels are well known in the art and incorporation of the inventive ceramic washer into a spinning reel may be easily accomplished by one of ordinary skill in the art. Thus, only the relevant portions of reel 100 are shown in cross section in FIG. 4. Reel 100 includes: a line spool 102 rotatably mounted over a main shaft 130. Spool 102 includes cavity 134 in which the components of the drag system are housed. Main shaft 130 includes a threaded portion 126 near its forward end. Washer 114, preferably formed of a fiber material is sandwiched between the forward face 104 of cavity 134 and ceramic washer 118. Ceramic washer 118 is nonrotatably keyed to shaft 130. Adjustment knob 124 is threadedly received on threaded portion 126 such that, as knob 124 is rotated, it moves forward or rearward along shaft 130 to increase or decrease pressure on spring washer 112. As will be apparent to those skilled in the art, as pressure is increased on spring 112, pressure is likewise increased on ceramic washer 118, washer 114 and face 104. Since ceramic washer 118 is keyed to main shaft 130, greater force will be required to rotate spool 102 as the pressure on spring 112 increases.

It should be noted that there are numerous alternatives to the above described structure which would readily accommodate the inventive ceramic drag washer. By way of example and not limitation, several alternative structures are described in U.S. Pat. No. 4,549,702 issued to Councilman and previously incorporated herein by reference. In addition, it should also be noted that many spinning reels employ a rear drag system. The inventive ceramic washer could be incorporated into such a drag system with the same ease with which it is incorporated into a front drag system as described hereinabove.

The present invention improves the drag assembly by providing a ceramic drag washer 40. In the preferred embodiment of the present invention, the ceramic drag washer comprises alumina, silicon nitride, or zirconia having a specific gravity and thermal expansion rate less than stainless steel and a hardness and compressive strength greater than stainless steel. Most preferably, such an alumina drag washer is formed of an alumina material having an alumina content of from about 95.0–99.9 percent and a Vickers Hardness (Load 500 g) of about 13.5–17.5 GPa. Acceptable alumina It materials are available from Kyocera Corporation under Kyocera Nos. A-460, A-476, A-479, A-479SS, A-479M, A-479G, A-480S and A-601D. Acceptable silicon nitride and zirconia materials are available from Kyocera under Kyocera Nos. SN-220, SN-235P, Z-220, Z-201N, and Z-701N.

Another important feature of the preferred ceramic materials is the dimensional precision which may be obtained in forming a drag washer. For example, flatness and parallelness of the sides of the washer are important to the operation of a drag system. With the preferred material, it is possible to economically produce a washer having sides with a flatness of 0.02 mm or better and which are parallel within 0.02 mm.

The foregoing materials, and other ceramic materials of like properties, function surprising well when used in drag washers for fishing reels. Their combination of high hardness and smooth surface finish, along with their light weight, fracture toughness, and shock resistance, render them extremely useful to achieve a high quality drag assembly. For example, in testing a fishing reel in which the inventive ceramic drag washer was employed, it was found that there was less than 15% variation in drag force as 30 yards of fishing line was pulled off the spool against the drag system. In comparison, it was found that the drag force in a fishing reel having a conventional stainless steel drag washer varied by 25% under the same test conditions.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. In a fishing reel having a frame, a line-carrying spool rotatably mounted relative to the frame, and a drag assembly, the improvement comprising:

at least one ceramic washer in said drag assembly, the compression of which may be increased or decreased to increase or decrease resistance to rotation of the spool, wherein said washer has a static coefficient of friction approximately equal to a dynamic coefficient of friction; and wherein said washer has a Vickers Hardness (Load 500 g) of about 13.5–17.5 Gpa.

2. A fishing reel according to claim 1, wherein said ceramic washer is made of an alumina material.

3. A fishing reel according to claim 2, wherein said alumina material has an alumina content of from about 95.0–99.9 percent.

4. A method of using a fishing reel comprising the steps of:

engaging an anti-reverse mechanism;

compressing a drag washer by adjusting a drag assembly to effect a desired drag force for selectively resisting line play out; and permitting fishing line to pull off of a spool wherein said drag force varies less than 15% as 30 yards of fishing line is pulled off said spool.

5. The method according to claim 4 wherein said washer is comprised of ceramic.

6. The fishing reel according to claim 4 wherein:

said washer has a specific gravity and thermal expansion rate less than stainless steel and a hardness and compressive strength greater than stainless steel.

7. The fishing reel according to claim 4 wherein said washer has sides with a flatness of at least 0.02 mm and which are parallel within at least 0.02 mm.

8. In a fishing reel having a frame, a line-carrying spool rotatably mounted relative to the frame, and a drag assembly, the improvement comprising:

at least one washer in said drag assembly, wherein a selective compression of said washer results in less than a 15% variation in drag force as 30 yards of fishing line is pulled off the spool.

9. The fishing reel according to claim 8 wherein said washer is comprised of ceramic.

10. The fishing reel according to claim 8 wherein said washer has a specific gravity and thermal expansion rate less than stainless steel and a hardness and compressive strength greater than stainless steel.

11. The fishing reel according to claim 8 wherein said washer has sides with a flatness of at least 0.02 mm and which are parallel within at least 0.02 mm.

* * * * *